United States Patent [19]
Simovich et al.

[11] Patent Number: 5,528,165
[45] Date of Patent: Jun. 18, 1996

[54] LOGIC SIGNAL VALIDITY VERIFICATION APPARATUS

[75] Inventors: Slobodan Simovich, San Francisco; Marc E. Levitt, Sunnyvale; Srinivas Nori, San Jose; Ramachandra P. Kunda, Milpitas, all of Calif.

[73] Assignee: Sun Microsystems, Inc., Mountain View, Calif.

[21] Appl. No.: 458,001

[22] Filed: Jun. 1, 1995

Related U.S. Application Data

[63] Continuation of Ser. No. 415,557, Apr. 3, 1995.

[51] Int. Cl.$^6$ .................................................... H03K 19/21
[52] U.S. Cl. ............................... 326/9; 326/21; 326/52; 371/57.2
[58] Field of Search .................................... 326/9–10, 14, 326/21, 52, 54, 16; 371/57.1–57.2, 68.3, 65

[56] References Cited

U.S. PATENT DOCUMENTS

| | | | |
|---|---|---|---|
| 3,705,357 | 12/1972 | Carter et al. | 326/14 X |
| 4,719,629 | 1/1988 | Wang | 371/68 |
| 5,059,834 | 10/1991 | Tago et al. | 326/21 |
| 5,311,479 | 5/1994 | Harada | 365/230.06 |
| 5,345,453 | 9/1994 | Bayer et al. | 371/68.1 |
| 5,376,915 | 12/1994 | Takeuchi et al. | 340/146.2 |

FOREIGN PATENT DOCUMENTS 402116216  4/1990  Japan ..................... 326/54

OTHER PUBLICATIONS

Duke et al, "Fail–Safe Storage Cell", *IBM Tech. Discl. Bull.*, vol. 11, No. 10, Mar. 1969, pp. 1229–1230.
Boland, "Two–Level NOT Exclusive OR", *IBM Tech. Disc. Bull.*, vol. 7, No. 9, Feb. 1965, pp. 743–744.
Boudeile, "One Out of N Detector", *IBM Tech. Disc. Bull.*, vol. 13, No. 6, Nov. 1970, pp. 1490–1491.

*Primary Examiner*—David R. Hudspeth
*Attorney, Agent, or Firm*—Limbach & Limbach

[57] ABSTRACT

A logic signal validity verifier for use in determining the validity of the logic states of a group of logic signals includes an inactive signal fault monitor for determining when all of the logic signals are in an inactive signal state and an active signal fault monitor for determining when more than one of the logic signals are in an active signal state. Where the logic signals are differential, the logic signal validity verifier further includes a differential signal fault monitor for determining when corresponding pairs of the differential logic signals are in the same active or inactive signal state.

30 Claims, 2 Drawing Sheets

LOGIC SIGNAL VALIDITY VERIFICATION APPARATUS

RELATED APPLICATIONS

This is a Continuation of U.S. patent application Ser. No. 08/415,557, filed Apr. 3, 1995, and entitled "Logic Signal Validity Verification Apparatus."

BACKGROUND OF THE INVENTION

1. Field of the Invention

The present invention relates to verification of functional relationships between logic signals, and in particular, to verification of logical exclusivity among a group of logic signals.

2. Description of the Related Art

A common problem faced by logic designers is that of verifying functional relationships among a group of logic signals. For example, the control signals responsible for enabling and disabling a C-MOSFET transmission gate must be opposite in phase, or polarity, from one another so as to properly enable and disable their respective MOSFETs at the correct times. Accordingly, the functional relationship between these signals, i.e. that of opposing phases, must be ensured.

Such logic signal validity verification is particularly important in the case of decoded multiplexors. As is well known, the data select signals for decoded multiplexors are predecoded, with each data input having its own distinct data select line (or its own distinct pair of data select lines for differential data select signals) associated with them. Since only one valid data signal can be passed through the multiplexor at any one time, only one data select signal is allowed to be active at such time, otherwise a data conflict will occur thereby resulting in undefined signal values at the data output. (Decoded, i.e. as opposed to encoded, multiplexors are often used because of their reduced integrated circuit chip area requirements and faster operational speeds due to their ability to share data select signal decoding circuitry among multiple multiplexors.)

Conventionally, numerous techniques have been used for verifying functional relationships among a group of logic signals. One such technique relies upon the development of a solution for a customized logic equation using a Binary Decision Diagram ("BDD") approach. (A discussion of BDDs can be found in R. E. Bryant, "Graph Based Algorithms For Boolean Function Manipulation," IEEE Transactions on Computers, August 1986, pp. 677–91.) However, the size of the BDD required quickly becomes a limiting factor when using this technique.

Accordingly, it would be desirable to have a logic signal validity verification technique with which the validity of functional relationships among a group of logic signals can be more quickly and easily verified.

SUMMARY OF THE INVENTION

In accordance with the present invention, the validity of functional relationships among a group of logic signals can be quickly and easily verified. This advantageously allows logic signal characteristics, such as whether and when more than the desired number of active or inactive logic signals are present among a group of logic signals, to be monitored and faults therein to be quickly and easily detected.

An apparatus with a logic signal validity verifier for use in determining the validity of the logic states of a plurality of logic signals in accordance with one embodiment of the present invention includes an inactive signal fault monitor and an active signal fault monitor. The inactive signal fault monitor is for monitoring logic signals having active and inactive signal states associated therewith and for providing an inactive signal fault signal identifying when all of the logic signals are in an inactive signal state. The active signal fault monitor is for monitoring the logic signals and providing an active signal fault signal identifying when more than one of the logic signals are in an active signal state.

An apparatus with a logic signal validity verifier in accordance with another embodiment of the present invention further includes a differential signal fault monitor for monitoring differential logic signals having first and second signals with active and inactive signal states associated therewith and for providing a differential signal fault signal identifying when both of the first and second signals of one or more of the differential logic signals are in an active or inactive signal state.

These and other features and advantages of the present invention will be understood upon consideration of the following detailed description of the invention and the accompanying drawings.

DETAILED DESCRIPTION OF THE INVENTION

Figure 1:
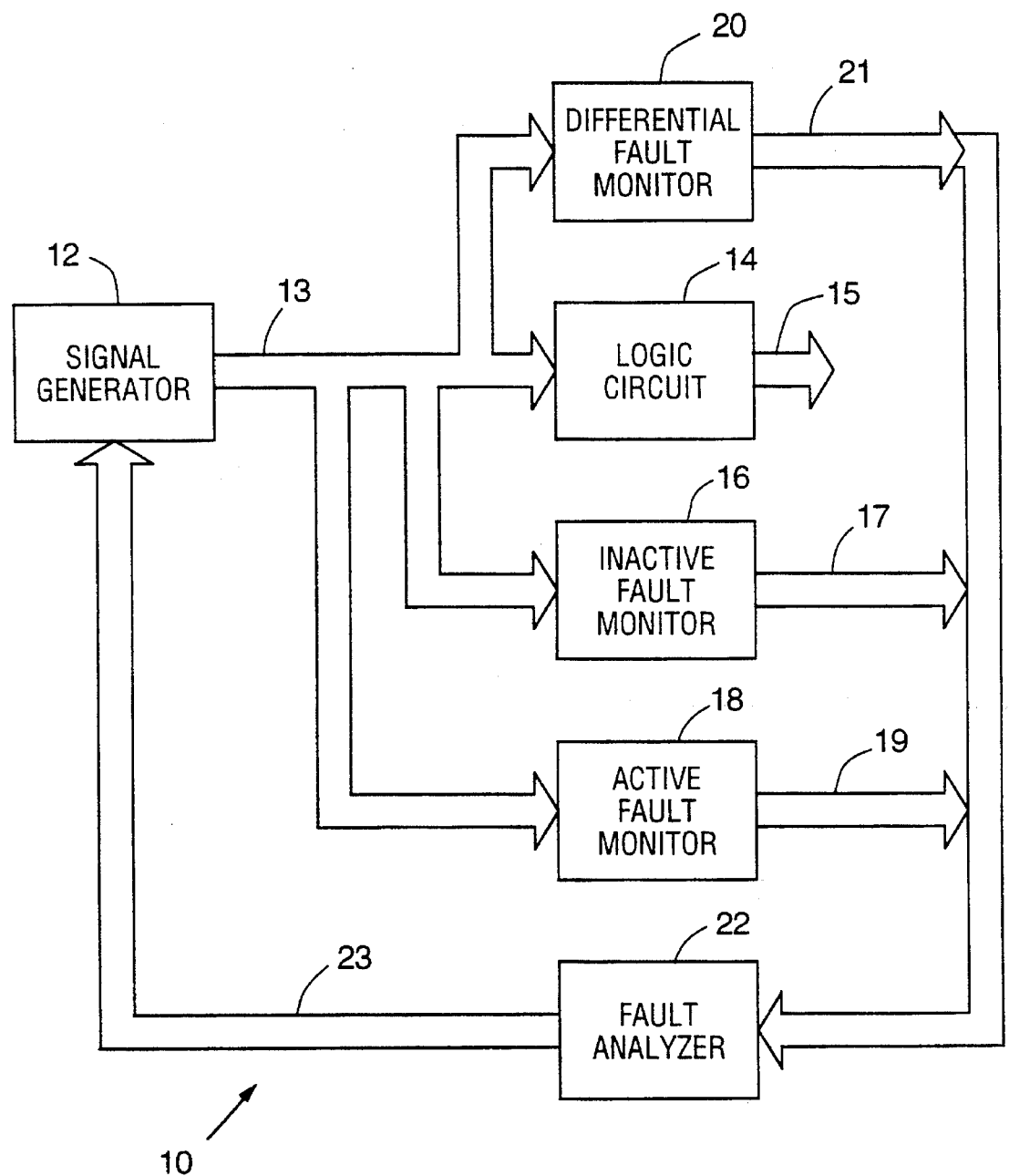
FIG. 1 is a functional block diagram of an apparatus including a logic signal validity verifier in accordance with one embodiment of the present invention.

Referring to FIG. 1, an apparatus 10 including a logic signal validity verifier in accordance with one embodiment of the present invention includes a signal generator 12, logic circuit 14, inactive fault monitor 16, active fault monitor 18, differential fault monitor 20 and fault analyzer 22, connected substantially as shown. The signal generator 12 generates a group of logic signals 13 which are received and processed by the logic circuit 14 to produce one or more output logic signals 15. This group of logic signals 13 is monitored by the inactive fault monitor 16, active fault monitor 18 and differential fault monitor 20. Each of the these fault monitors 16, 18, 20 provides one or more output fault signals 17, 19, 21 which are received and analyzed by the fault analyzer 22 which, in turn, generates one or more control signals 23 for controlling the signal generator 12.

The signal generator 12 is a logic circuit (including a software-controlled circuit) used for generating the logic signals 13 driving the logic circuit 14. In turn, the logic circuit 14 can be any form of logic circuitry used for receiving and processing the logic signals 13 generated by the signal generator 12 (such as a multiplexor as discussed further below). Each of the fault monitors 16, 18, 20 and the fault analyzer 22 can be a microprocessor, a microcontroller, a computer or any other form of software-controllable apparatus capable of monitoring and evaluating a number of logic signals and generating the corresponding fault signals 17, 19, 21 or control signals 23, respectively.

In accordance with well known principles, each of the input logic signals 13 has an active and an inactive signal state associated therewith. For example, in "active high" logic each logic signal 13 is considered to be "active" (logic 1) when in a "logic high" state (e.g. +5 or +3.3 volts) and "inactive" (logic 0) when in a "logic low" state (e.g. 0 volts), while in "active low" logic each logic signal 13 is considered to be "active" (logic 0) when in a "logic low" state (e.g. 0 volts) and "inactive" (logic 1) when in a "logic high" state (e.g. +5 or +3.3 volts). Further, in the case of differential logic signals, each logic signal is actually a pair of signals which are opposite in phase or polarity. Accordingly, when a differential logic signal is "active" one signal phase is of one polarity with respect to the other, while when such signal is "inactive" their relative phases are reversed. In the following discussion, it is presumed that "active high" logic signal states are used; however, it should be understood that with appropriate inversion(s) of the logic signals of interest, the following discussion will be equally applicable to the use of "active low" logic signal states.

The inactive fault monitor 16 monitors the logic signals 13 to determine whether and when more than the desired number of inactive logic signals are present. Similarly, the active fault monitor 18 monitors the logic signals 13 to determine whether and when more than the desired number of active logic signals are present. For example, where logical exclusivity is required, e.g. where only one of the logic signals 13 is to be active at any one time, the inactive fault monitor 16 provides one or more inactive signal fault signals 17 identifying when all of the logic signals 13 are in inactive signal states, while the active fault monitor 18 provides one or more active signal fault signals 19 identifying when more than one of the logic signals 13 are in active signal states.

Where the logic signals 13 used are differential, the differential fault monitor 20 monitors both phases of each of the logic signals 13 to determine whether and when one of the differential signal phases is erroneously active or inactive. Accordingly, when a differential fault is detected, the differential fault monitor 20 provides one or more differential signal fault signals 21 identifying when corresponding pairs of differential signal phases are in the same state.

Verification of the validity of the functional relationships among the logic signals 13 is accomplished through coordinated operation of the fault analyzer 22 and signal generator 12. While monitoring the output fault signals 17, 19, 21 from the fault monitors 16, 18, 20, the fault analyzer 22 provides one or more control signals 23 to the signal generator 12 to cause the signal generator 12 to generate an appropriate sequence of logic signals 13 to test for the above-discussed active and inactive logic faults. This generating of logic vectors for the logic signals 13 can be accomplished by way of any of a number of conventional techniques, including the use of Automatic Test Pattern Generation ("ATPG") techniques which are well known in the art. (Descriptions of such ATPG techniques can be found in: J. P. Roth, W. G. Bouricius and P. R. Schneider, "Programmed Algorithms to Compute Tests to Detect Between Failures In Logic Circuits," IEEE Transactions on Computers, Vol. EC-16, October 1967, pp. 567–80; and P. Goel, "An Implicit Enumeration Algorithm to Generate Tests For Combinational Logic Circuits," IEEE Transactions on Computers, Vol. C-30, No. 3, March 1981, pp. 215–22.)

Figure 2:
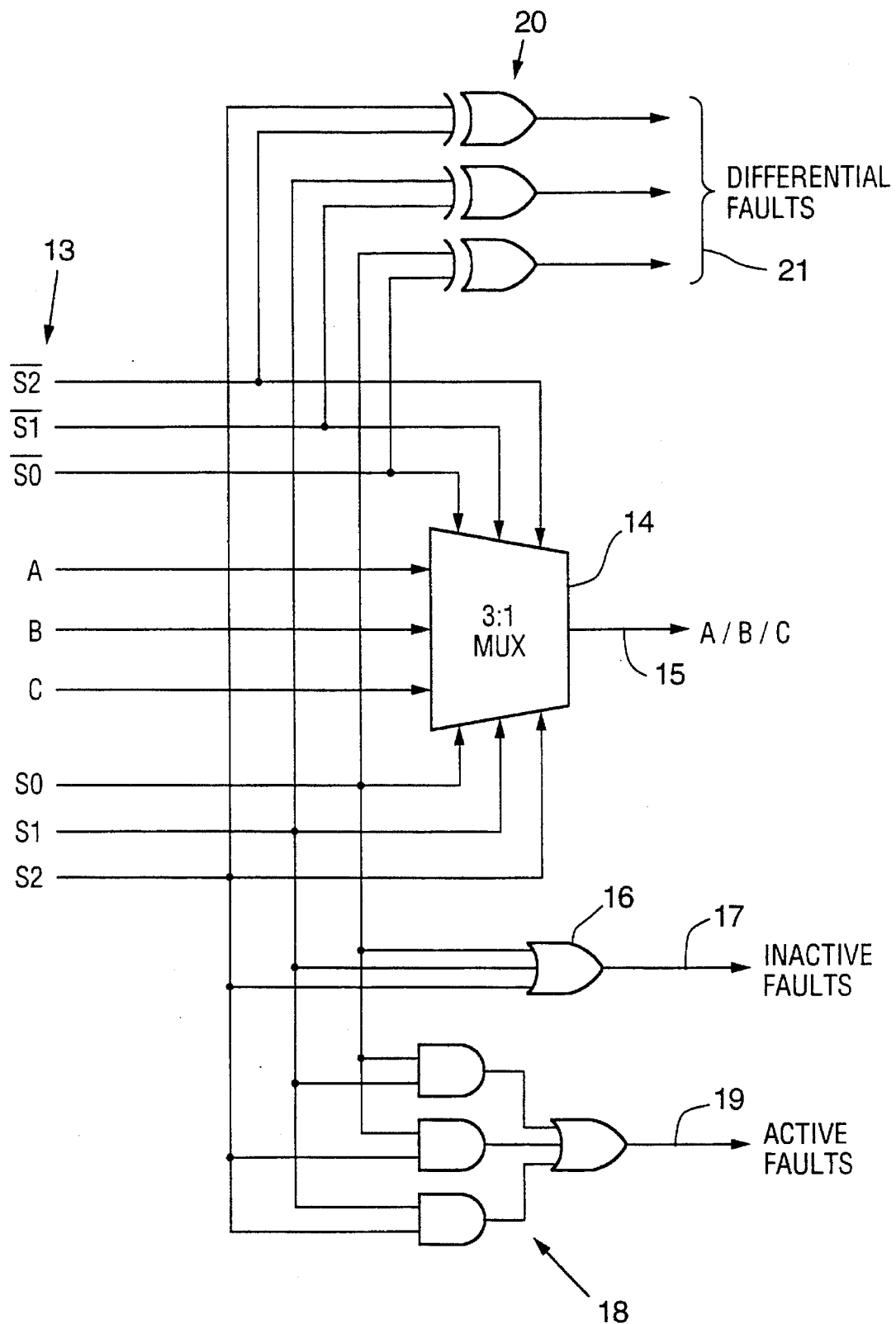
FIG. 2 is a logic diagram of an exemplary logic signal validity verifier circuit in accordance with one embodiment of the present invention.

Referring to FIG. 2, an example of a logic signal validity verifier circuit in accordance with one embodiment of the present invention includes a decoded 3:1 multiplexor as the logic circuit 14, an OR gate as the inactive fault monitor 16, three AND gates and an OR gate as the active fault monitor 18, and three EXCLUSIVE-OR gates as the differential fault monitor 20, all connected substantially as shown. The input logic signals 13 include three input data signals A, B, C and three data select signals S0, S1, S2 (and their inverse phases $\overline{S0}, \overline{S1}, \overline{S2}$ where such signals are differential). In accordance with well known principles, the multiplexor 14, in accordance with the data select lines S0, S1, S2 which should have mutually exclusive active signal states, selects one of the data input signals A, B, C to output as the output signal 15. In accordance with the foregoing discussion, the fault monitors 16, 18, 20 are used to monitor the data select signals S0, $\overline{S0}$, S1, $\overline{S1}$, S2, $\overline{S2}$ and identify when any are erroneously active or inactive.

The OR gate forming the inactive fault monitor 16 identifies when all of the data select signals S0, S1, S2 are inactive. (In the context of an ATPG test, when all such signals are inactive, a "stuck-at-1" test for signal 17 is deemed to exist, i.e. a test for determining whether any of the signal lines are stuck at a logic 1.) The AND gates and OR gate forming the active fault monitor 18 identify when more than one of the data select signals S0, S1, S2 are active. (In the context of an ATPG test, when more than one of such signals are active, a "stuck-at-0" test for signal 19 is deemed to exist, i.e. a test for determining whether any of the signal lines are stuck at a logic 0.) Each of the EXCLUSIVE-OR gates forming the differential fault monitor 20 monitors both phases of one of the differential data select signal pairs S0/$\overline{S0}$, S1/$\overline{S1}$, S2/$\overline{S2}$ and identifies when any of the corresponding pairs of data select signals S0/$\overline{S0}$, S1/$\overline{S1}$, S2/$\overline{S2}$ are in the same logic state.

It should be recognized that the fault monitors 16, 18, 20 can advantageously be integrated within an integrated circuit and/or incorporated, e.g. programmed, into a microprocessor, microcontroller, computer or any other form of software-controllable apparatus, along with the logic whose logic signals are to be monitored, thereby providing a built-in self test capability for the functional relationships among the logic signals 13. While providing this capability does involve adding a number of logic gates, it should be appreciated that the actual number of such logic gates need not necessarily correspond directly to the number of individual logic circuits 14 sought to be tested. Where multiple logic circuits share common logic signals, fewer logic gates will be required. (For example, a floating point divider designed by the Assignee has a total of 2006 decoded multiplexors which share only 23 distinct sets of data select lines which are monitored for logical exclusivity.)

As should be understood from the foregoing discussion, an apparatus including a logic signal validity verifier in accordance with the present invention quickly and easily verifies functional relationships among a group of logic signals. This verification includes determining whether and when: (a) more than one logic 1 can occur among a group of logic signals whose active states are intended to be mutually exclusive; (b) all such logic signals can be set to a logic 0; and (c) both phases of one or more differential logic signals can be active.

Major advantages of a logic signal validity verifier in accordance with the present invention include the ability to use arbitrary, off-the-shelf ATPG tools (as opposed to requiring development of customized solutions), fast test results and reduced memory requirements for generating the necessary logical test vectors.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a logic signal validity verifier for use in determining the validity of the logic states of a plurality of logic signals, said signal validity verifier comprising:

an inactive signal fault monitor for monitoring a plurality of logic signals having active and inactive signal states associated therewith and providing an inactive signal fault signal identifying when all of said plurality of logic signals are in said inactive signal state; and an active signal fault monitor for monitoring said plurality of logic signals and providing an active signal fault signal identifying when more than one but less than all of said plurality of logic signals are in said active signal state.

2. The apparatus of claim 1, wherein said inactive signal fault monitor performs an OR function.

3. The apparatus of claim 1, wherein said active signal fault monitor performs a plurality of AND functions.

4. The apparatus of claim 1, further comprising a signal generator for providing said plurality of logic signals with a preselected combination of said active and inactive signal states associated therewith.

5. The apparatus of claim 4, further comprising an output monitor for monitoring said inactive and active signal fault signals and providing an output fault signal identifying when one or more of said plurality of logic signals is in one of said active and inactive signal states.

6. The apparatus of claim 1, further comprising an integrated circuit into which said logic signal validity verifier is integrated.

7. The apparatus of claim 1, further comprising a computer into which said logic signal validity verifier is incorporated.

8. A method of providing an apparatus including a logic signal validity verifier for use in determining the validity of the logic states of a plurality of logic signals, said method comprising the steps of:

providing an inactive signal fault monitor for monitoring a plurality of logic signals having active and inactive signal states associated therewith and outputting an inactive signal fault signal identifying when all of said plurality of logic signals are in said inactive signal state; and providing an active signal fault monitor for monitoring said plurality of logic signals and outputting an active signal fault signal identifying when more than one but less than all of said plurality of logic signals are in said active signal state.

9. The method of claim 8, wherein said step of providing an inactive signal fault monitor comprises providing an OR function.

10. The method of claim 8, wherein said step of providing an active signal fault monitor comprises providing a plurality of AND functions.

11. The method of claim 8, further comprising the step of providing a signal generator for outputting said plurality of logic signals with a preselected combination of said active and inactive signal states associated therewith.

12. The method of claim 11, further comprising the step of providing an output monitor for monitoring said inactive and active signal fault signals and outputting an output fault signal identifying when one or more of said plurality of logic signals is in one of said active and inactive signal states.

13. The method of claim 8, further comprising the step of providing an integrated circuit into which said logic signal validity verifier is integrated.

14. The method of claim 8, further comprising the step of providing a computer into which said logic signal validity verifier is incorporated.

15. A method of logic signal validity verification for use in determining the validity of the logic states of a plurality of logic signals, said method comprising the steps of:

receiving a plurality of logic signals each one of which having active and inactive signal states associated therewith;

monitoring said plurality of logic signals and outputting an inactive signal fault signal identifying when all of said plurality of logic signals are in said inactive signal state; and monitoring said plurality of logic signals and outputting an active signal fault signal identifying when more than one but less than all of said plurality of logic signals are in said active signal state.

16. The method of claim 15, wherein said step of monitoring said plurality of logic signals and outputting an inactive signal fault signal identifying when all of said plurality of logic signals are in said inactive signal state comprises monitoring said plurality of logic signals in accordance with an OR function.

17. The method of claim 15, wherein said step of monitoring said plurality of logic signals and outputting an active signal fault signal identifying when more than one of said plurality of logic signals are in said active signal state comprises monitoring said plurality of logic signals in accordance with a plurality of AND functions.

18. The method of claim 15, further comprising the step of generating said plurality of logic signals with a preselected combination of said active and inactive signal states associated therewith.

19. The method of claim 18, further comprising the step of monitoring said inactive and active signal fault signals and outputting an output fault signal identifying when one or more of said plurality of logic signals is in one of said active and inactive signal states.

20. The method of claim 15, further comprising the step of performing the recited logic signal validity verification steps within an integrated circuit.

21. The method of claim 15, further comprising the step of performing the recited logic signal validity verification steps within a computer.

22. An apparatus including a logic signal validity verifier for use in determining the validity of the logic states of a plurality of logic signals, said signal validity verifier comprising:

an inactive signal fault monitor for monitoring a plurality of logic signals having active and inactive signal states associated therewith and providing an inactive signal fault signal identifying when all of said plurality of logic signals are in said inactive signal state; and an active signal fault monitor for monitoring said plurality of logic signals and providing an active signal fault signal identifying when more than one of said plurality of logic signals are in said active signal state;

wherein said plurality of logic signals comprises a plurality of differential logic signals, and wherein each one of said plurality of differential logic signals includes first and second signals having active and inactive signal states associated therewith.

23. The apparatus of claim 22, further comprising a differential signal fault monitor for monitoring said plurality of differential logic signals and providing a differential signal fault signal identifying when both of said first and second signals of one or more of said plurality of differential logic signals are in one of said active and inactive signal states.

24. The apparatus of claim 23, wherein said differential signal fault monitor performs a plurality of EXCLUSIVE-OR functions.

25. A method of providing an apparatus including a logic signal validity verifier for use in determining the validity of the logic states of a plurality of logic signals, said method comprising the steps of:

providing an inactive signal fault monitor for monitoring a plurality of logic signals having active and inactive signal states associated therewith and outputting an inactive signal fault signal identifying when all of said plurality of logic signals are in said inactive signal state; and providing an active signal fault monitor for monitoring said plurality of logic signals and outputting an active signal fault signal identifying when more than one of said plurality of logic signals are in said active signal state;

wherein said plurality of logic signals comprises a plurality of differential logic signals, and wherein each one of said plurality of differential logic signals includes first and second signals having active and inactive signal states associated therewith.

26. The method of claim 25, further comprising the step of providing a differential signal fault monitor for monitoring said plurality of differential logic signals and outputting a differential signal fault signal identifying when both of said first and second signals of one or more of said plurality of differential logic signals are in one of said active and inactive signal states.

27. The method of claim 26, wherein said step of providing a differential signal fault monitor comprises providing a plurality of EXCLUSIVE-OR functions.

28. A method of logic signal validity verification for use in determining the validity of the logic states of a plurality of logic signals, said method comprising the steps of:

receiving a plurality of logic signals by receiving a plurality of differential logic signals as said plurality of logic signals, wherein each one of said plurality of differential logic signals includes first and second signals having active and inactive signal states associated therewith;

monitoring said plurality of logic signals and outputting an inactive signal fault signal identifying when all of said plurality of logic signals are in said inactive signal state; and monitoring said plurality of logic signals and outputting an active signal fault signal identifying when more than one of said plurality of logic signals are in said active signal state.

29. The method of claim 28, further comprising the step of monitoring said plurality of differential logic signals and outputting a differential signal fault signal identifying when both of said first and second signals of one or more of said plurality of differential logic signals are in one of said active and inactive signal states.

30. The method of claim 29, wherein said step of monitoring said plurality of differential logic signals and outputting a differential signal fault signal identifying when both of said first and second signals of one or more of said plurality of differential logic signals are in one of said active and inactive signal states comprises monitoring said plurality of differential logic signals in accordance with a plurality of EXCLUSIVE-OR functions.

* * * * *